United States Patent
Draghetti

(10) Patent No.: US 6,598,647 B1
(45) Date of Patent: Jul. 29, 2003

(54) DEVICE AND A METHOD FOR THE APPLICATION OF DETACHABLE COUPONS TO SUBSTANTIALLY PARALLELEPIPED PACKETS

(75) Inventor: Fiorenzo Draghetti, Medicina (IT)

(73) Assignee: G.D S.p.A., Bologna (IT)

(*) Notice: Subject to any disclaimer, the term of this patent is extended or adjusted under 35 U.S.C. 154(b) by 0 days.

(21) Appl. No.: 09/355,204
(22) PCT Filed: Nov. 23, 1998
(86) PCT No.: PCT/IB98/01858
§ 371 (c)(1),
(2), (4) Date: Jul. 26, 1999
(87) PCT Pub. No.: WO99/28195
PCT Pub. Date: Jun. 10, 1999

(30) Foreign Application Priority Data

Dec. 2, 1997 (IT) .......................................... BO97A0698

(51) Int. Cl.⁷ .............................. B65C 1/04; B65C 1/06
(52) U.S. Cl. ...................... 156/566; 156/556; 156/567; 156/568; 156/DIG. 1; 156/DIG. 3; 156/DIG. 4

(58) Field of Search ................................ 156/556, 559, 156/566, 567, 568, DIG. 2, DIG. 3, DIG. 4, DIG. 30, DIG. 39

(56) References Cited

U.S. PATENT DOCUMENTS

| 2,621,434 A | | 12/1952 | Jackson et al. | |
|---|---|---|---|---|
| 4,602,977 A | * | 7/1986 | Voltmer et al. | ............. 156/449 |
| 5,019,207 A | | 5/1991 | McCoy | |
| 5,111,633 A | * | 5/1992 | Draghetti | ..................... 53/136 |

FOREIGN PATENT DOCUMENTS

| EP | 218 925 | 4/1987 |
|---|---|---|
| WO | 97/32785 | 9/1997 |

* cited by examiner

Primary Examiner—Richard Crispino
Assistant Examiner—Sue A. Purvis
(74) Attorney, Agent, or Firm—Davidson Berquist; Klima & Jackson, LLP

(57) ABSTRACT

In a machine (1) for the manufacture of packets substantially parallelepiped in shape, typically containing cigarettes, the packets (4) advance in succession on a conveyor belt (P) toward an affixing station (7), where a revenue stamp (8) and a detachable coupon (3) are attached simultaneously to each one in turn by a single applicator device (2).

2 Claims, 3 Drawing Sheets

DEVICE AND A METHOD FOR THE APPLICATION OF DETACHABLE COUPONS TO SUBSTANTIALLY PARALLELEPIPED PACKETS

This application is the national phase of international application PCT/IB98/01858 filed Nov. 23, 1998 which designated the U.S.

TECHNICAL FIELD

The present invention relates to a device for the application of detachable coupons to substantially parallelepiped packets.

In particular, the invention can be employed to advantage in machines for manufacturing packets of cigarettes, and it is to this art field that direct reference is made in the following specification, albeit with no limitation in scope implied.

The term "coupon" is employed throughout the present disclosure to indicate a slip of paper or a card printed on at least one side and intended as a trading stamp, or an advertising medium, which in many countries is associated with single packets of cigarettes.

Coupons can be placed inside the packet between an inner wrapper of metal foil paper and an outer wrapping (the inner wrapper enveloping a group of cigarettes), or alternatively, applied directly to the outer wrapping.

Of the two methods mentioned, the more popular in recent times has been that of applying the coupon directly to the outer wrapping, even though this involves the use of dedicated applicator devices which, remembering the high velocities at which the packets are caused to advance along the wrapping lines and the level of precision required, tend to become increasingly complicated, cumbersome and costly.

It has been found for example that when a printed coupon is placed inside the packet and located in contact with the internal wrapper enveloping the cigarettes, the vapours given off by the inks on the printed face of the coupon can affect the aroma of the tobacco in the cigarettes.

BACKGROUND ART

The prior art relative to the field of machines for manufacturing packets of cigarettes also embraces the practice of applying a slip of paper, generally a government revenue stamp, to the outer wrapping of each packet. The relative operation is carried out by applicator devices of conventional type as the packets are transferred along a predetermined path from a packaging machine toward a successive overwrapping machine by which each assembled packet is enveloped in a sheet of transparent material.

Given the need to carry out both the operations in question on the outer wrapping of each packet, i.e. to apply a revenue stamp and a coupon at one and the same time, drawbacks both of a technical nature and of an economical nature are involved.

In particular, a packaging machine equipped both with applicator devices for affixing revenue stamps and with applicator devices for affixing coupons can assume overall dimensions not always compatible with the space available, and there are also mechanical complications that tend to impact heavily on the structural and functional efficiency of the machine, reducing its reliability and significantly increasing its cost.

The object of the present invention is to provide a device for the application of detachable coupons to substantially parallelepiped packets, such as can be guaranteed free of the drawbacks described above and embodied as simply as possible.

DISCLOSURE OF THE INVENTION

According to the present invention, the stated object is realized in a device for the application of detachable coupons to substantially parallelepiped packets in machines for the manufacture of packets to which revenue stamps are applied, separate from the coupons, comprising conveyor means by which the packets are advanced in succession along a set path toward a station at which the stamps are affixed, of which the essential feature is that it comprises applicator means in the vicinity of the affixing station, disposed and embodied in such a manner as to apply both the stamps and the coupons to the packets.

The present invention also relates to a method of applying detachable coupons to substantially parallelepiped packets.

A method according to the invention for applying detachable coupons to substantially parallelepiped packets in machines for manufacturing such packets comprises the steps of advancing the packets in succession along a predetermined path toward an affixing station and applying a revenue stamp to each packet passing through the station, a coupon being applied to each packet at the affixing station together with a relative stamp.

The invention will now be described in detail, by way of example, with the aid of the accompanying drawings, in which.

Figure 1:
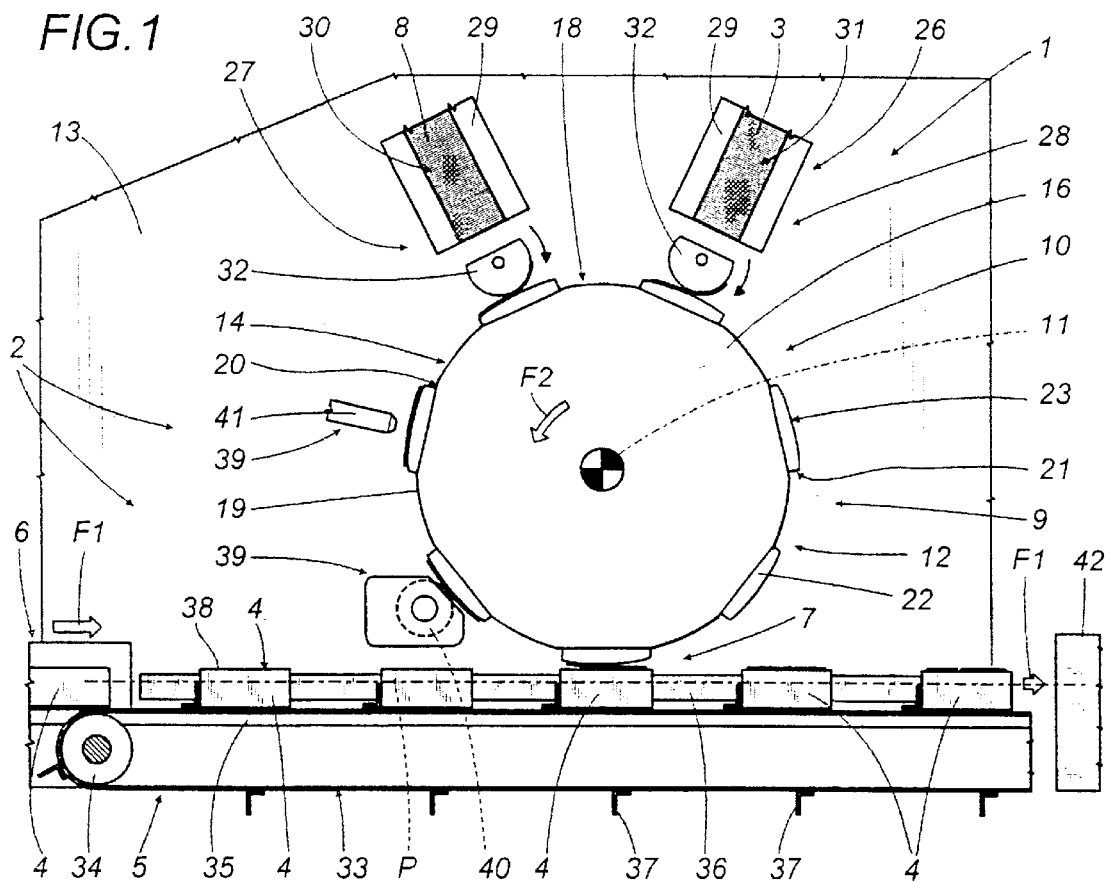
FIG. 1 illustrates a portion of a packaging machine equipped with a device according to the invention for applying detachable coupons to packets, shown in a first embodiment, viewed schematically in a side elevation with certain parts in section and others omitted for clarity.
Figure 2:
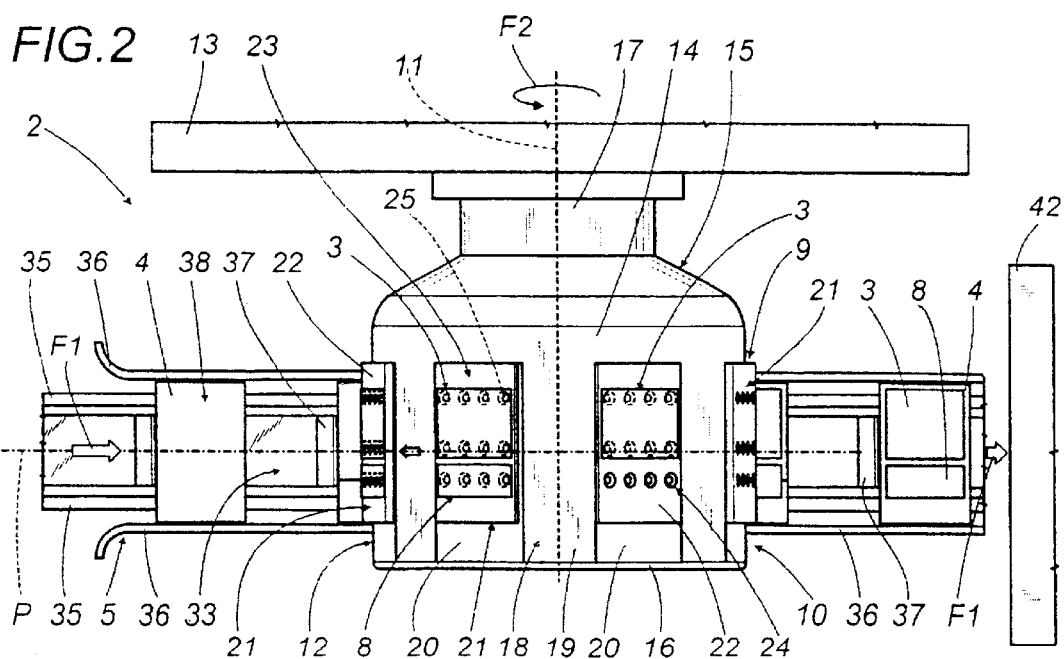
FIG. 2 shows the device of FIG. 1, illustrated schematically and in plan.
Figure 3:
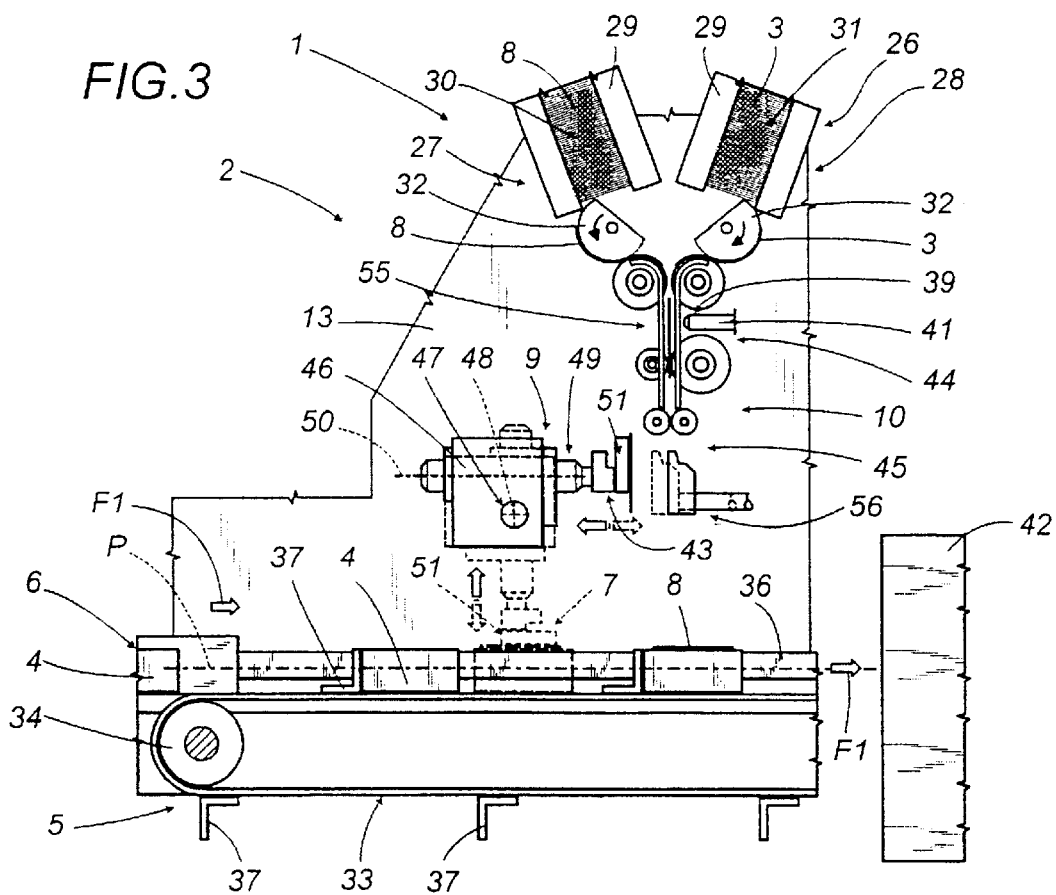
FIG. 3 illustrates a portion of a packaging machine equipped with a device according to the invention for applying detachable coupons to packets, shown in a second embodiment, viewed schematically in a side elevation with certain parts in section and others omitted for clarity.

With reference to FIGS. 1, 2 and 3 of the drawings, 1 denotes a portion of a packaging machine, and 2 denotes a device, in its entirety, for applying detachable coupons 3 to packets 4 of substantially parallelepiped shape, which in the example of the drawings are cigarette packets of rigid type with a hinged lid.

The portion 1 of the packaging machine comprises conveyor devices, denoted 5 in their entirety, by which packets 4 are received at an infeed station 6 and advanced in succession along a predetermined feed path P, following a feed direction denoted F1, toward an affixing station 7 at which a slip of paper consisting in a manufacturing revenue stamp 8 is applied to each one.

Observing FIGS. 1, 2, 3 and 5 of the drawings, the device 2 will be seen to comprise applicator means associated with the affixing station 7, denoted 9 in their entirety, by which revenue stamps 8 and coupons 3 are applied simultaneously to the single packets 4. Accordingly, the applicator means 9 used to affix the coupons 3 are one and the same as the applicator means used to affix the stamps 8.

More exactly, the portion 1 of the machine shown in FIGS. 1 and 2 is substantially of the type disclosed in U.S. Pat. No. 5,111,633, and the applicator means 9 comprise a feeding and affixing unit 10 by which the stamps 8 and the coupons 3 are supplied and applied to each packet 4. The unit 10 comprises a rotary conveyor or drum 12, disposed in such a way as to rotate about a respective axis 11 and substantially tangential to the feed path P at a point coinciding with the affixing station 7, as will be explained in due course.

The drum 12 is cantilevered from a fixed vertical wall 13 afforded by the portion 1 of the packaging machine, its axis of rotation 11 transverse to the feed path P, and comprises a bell housing 14 of substantially cylindrical geometry enclosed at one end by a cowl 15 directed toward the wall 13, and at the opposite end by a cover 16. The drum 12 is supported by way of a sleeve 17 disposed coaxially with a cylindrical wall 18 of the bell housing 14 and extending between the cowl 15 and the wall 13, to which it is secured. The sleeve 17 accommodates drive components (conventional in embodiment and therefore not illustrated) by which the drum 12 is set in rotation about its axis 11 in the direction of the arrow denoted F2.

The cylindrical wall 18 is delimited externally by a cylindrical surface of revolution 19 exhibiting a plurality of flats 20 equispaced angularly one from the next, each of which affords a surface serving to support a respective element 21 retaining both a stamp 8 and a coupon 3. Each individual element 21 appears as a block 22 associated rigidly with the cylindrical wall 18 and exhibiting an outwardly directed surface 23 of cylindrically arched profile concentric with the drum 12. The drum is embodied also with a plurality of ducts (not shown) passing both through the wall 18 and through each block 22, which terminate externally in suction holes 24 and 25 (visible in FIG. 2) serving to retain the single stamps 8 and coupons 3, respectively. The holes 24 and 25 are arranged in rows across the surface 23 of each block 22, and connected by way of the ducts with a conventional pneumatic circuit not shown in the drawings.

As already stated, the portion 1 of the packaging machine described thus far and illustrated in the drawings is disclosed in U.S. Pat. No. 5,111,633, to which reference can also be made for a description of the structure and the operation of the drive means associated with the drum 12, and of the pneumatic circuit.

The feeding and affixing unit 10 also comprises a unit 26 from which both the stamps 8 and the coupons 3 are dispensed. The dispensing unit 26 is mounted to the vertical wall 13 and comprises first and second lines 27 and 28 by which the stamps 8 and coupons 3, respectively, are stored and fed to the applicator means 9. Each line 27 and 28 is equipped with a magazine 29 containing a stack 30 of revenue stamps 8 and a stack 31 of coupons 3, respectively. According to prior art methods, the stamps 8 and the coupons 3 are taken up by a relative circular sector 32 from the bottom of each stack 30 and 31, utilizing the force of suction, and transferred cyclically by the sector to each block 22 of the drum 12. It will be appreciated in this regard that the two lines 27 and 28 occupy two different planes offset one from another: that is, when observing FIG. 1, the line denoted 27 is nearer to the viewer than the line denoted 28, so that the stamps 8 and the coupons 3 are transferred to the single blocks 22 positioned alongside one another as illustrated in FIG. 2.

As discernible from FIGS. 1 and 2, the conveyor devices 5 comprise a substantially horizontal belt conveyor 33 looped around pulleys 34 (of which one only is illustrated) and driven in such a manner as to advance a succession of packets 4 of cigarettes along the feed path P in the direction denoted F1, each lying flat with the longitudinal axis disposed transversely to the path P, in contact thus with a horizontal surface afforded by a pair of rails 35 spaced apart one from another by a given distance and extending parallel to the wall 13, orthogonal to the axis 11 of the drum 12.

The packets 4 are maintained in alignment during their progress along the feed path P by two lateral conveyors 36 located on each side and above the top branch of the belt conveyor 33, which in turn is equipped externally with a plurality of uniformly distributed outwardly projecting slats 37 occupying the space between the two rails 35, in such a way as to engage the packets 4 and advance them toward the affixing station 7. Also, the belt conveyor 33 is timed with the drum 12 in such a way that the passage through the station 7 of a slat 37, hence also of a packet 4, will always correspond with the passage along the path P and through the station 7 of a block 22, advancing with its outer surface 23 disposed tangentially to a face 38 of the packet 4 in such a way as to affix both the stamp 8 and the coupon 3 to this selfsame face 38.

In operation, observing FIGS. 1 and 2, the stamps 8 and the coupons 3 are transferred singly from above to the periphery of the drum 12 by the respective circular sectors 32, then deposited cyclically onto the surfaces 23 of the relative blocks 22 by the sectors and retained in conventional manner, each by a respective set of suctions holes 24 and 25 of the same block 22.

Once attached to a relative block 22, the stamp 8 and the coupon 3 are transferred by the drum 12 in the direction denoted F2, describing a continuous angular movement, first through a gumming station 39 at which their outward facing surfaces are coated with glue in familiar fashion either by contact with the surface of a gumming roller 40 or by means of a spray nozzle 41, and then to the affixing station 7 where both the stamp 8 and the coupon 3 will meet a corresponding packet 4. As the drum 12 rotates, more exactly, the packet 4 will be advanced by the belt conveyor 33 along the feed path P, timed in such a manner that its arrival at the affixing station 7 coincides with the arrival of the relative stamp 8 and coupon 3, which are directed through the station 7 at a peripheral velocity substantially identical to the linear velocity of the packets advancing along the feed path P and applied in conventional manner to one and the same face 38 of the packet 4 through the agency of the block 22.

The affixing operation having been completed, the packets 4 continue to advance along the feed path P in the direction denoted F1 toward an overwrapping machine, represented schematically by a block 42 in the drawings, by which they will be enveloped in a transparent plastic material in conventional manner (not illustrated).

Turning to the example of FIG. 3, the applicator means 9 and the feeding and affixing unit 10 are embodied differently to those illustrated in FIGS. 1 and 2; more precisely, the drum 12 is replaced by an applicator arm 43 of a type and design familiar from U.S. Pat. No. 4,181,561, whilst in addition to the unit denoted 26, the feeding and affixing unit 10 is equipped with devices 44 by which the stamps 8 and coupons 3 are taken up singly by the applicator arm 43 from the relative magazines 29 at a pickup point denoted 45.

Figure 4:
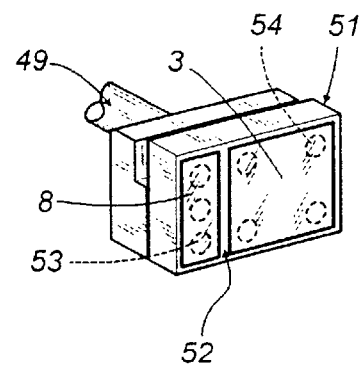
FIG. 4 shows a detail of the device in FIG. 3, illustrated schematically and in perspective.
Figure 5:
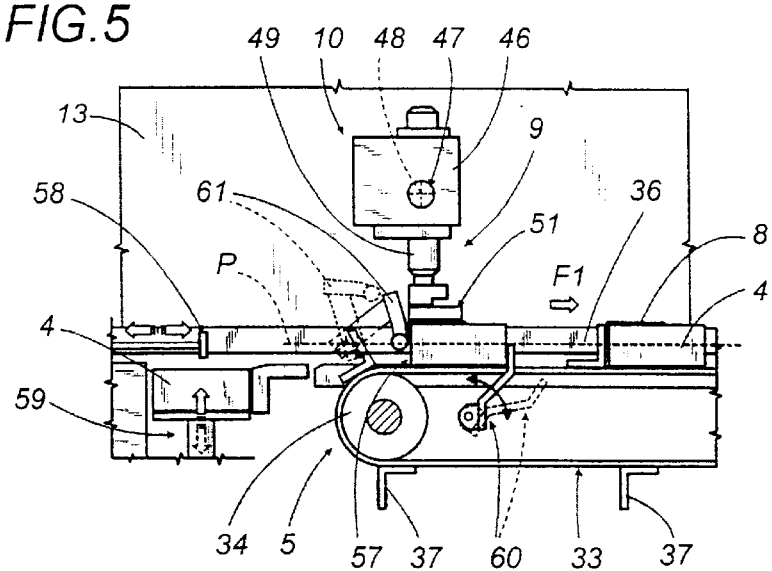
FIG. 5 illustrates an alternative embodiment of the device in FIG. 3, viewed schematically in a side elevation with certain parts omitted for clarity.

As illustrated in FIG. 3 and FIG. 5, the applicator arm 43 comprises a housing 46 mounted to a shaft 47 supported by the vertical wall 13 and rotatable about its own axis 48, which extends perpendicular to the wall 13 and transversely to the feed path P, through the agency of corresponding drive means (conventional in embodiment and not illustrated). The housing 36 supports a shaft 49 that is slidable longitudinally along its own axis So relative to the housing 46 and carries a head 51 at one end; the head 51 constitutes the retaining element 21, as indicated in FIG. 4, and accordingly, exhibits a base 52 affording a plurality of suction holes 53 positioned to attract the stamps 8 and a plurality of holes 54 positioned to attract the coupons 3. The holes 53 and 54 are connected via ducts (not illustrated) to a pneumatic circuit of conventional embodiment (likewise not illustrated).

The rotation of the shaft 47 allows the applicator arm 43 to alternate cyclically, in synchronism with the feeding and affixing unit 10 and the conveyor devices 5, between a first receiving and retaining position, with the head 51 disposed in readiness to take up the stamps 8 and coupons 3 at the pickup point 45, and a second position, assumed when the head 51 is rotated into the affixing station 7 and takes up a position substantially tangential to the feed path P, as will be described in due course, in which the stamps 8 and coupons 3 are released and affixed to the packets 4.

As already stated, the applicator arm 43 is of the type disclosed in U.S. Pat. No 4,181,561, to which reference can also be made for a full description of the structure and the operation of the drive means associated with the housing 46 and the shaft 49, and of the pneumatic circuit.

Figure 3A:
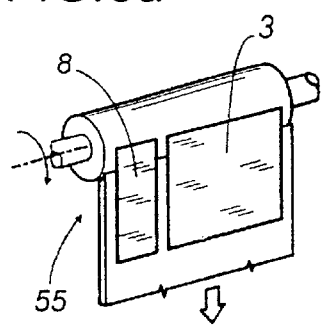
FIG. 3a shows a detail of FIG. 3, illustrated schematically and in perspective.

Similarly to the example of FIG. 1, the feeding and affixing unit 10 illustrated in FIG. 3 comprises a dispensing unit 26 supplying both revenue stamps 8 and coupons 3. The unit 26 in question is mounted to the vertical wall 13 and comprises first and second lines 27 and 28 storing and dispensing the stamps 8 and the coupons 3, respectively. Each of the lines 27 and 28 is equipped with a magazine 29 containing a stack 30 of stamps 8 and a stack 31 of coupons 3, respectively. The stamps 8 and coupons 3 are taken up by suction from the bottom of the two stacks 30 and 31 onto the circular sectors 32 and transferred cyclically to a common channel 55 along which the conventional take-up devices 44 operate. Likewise in this instance, it will be observed that the two lines 27 and 28 occupy two different planes offset one from another, so that the stamps 8 and the coupons 3 are transferred to and directed along the channel 55 in positions one alongside the other as illustrated in FIG. 3a and thereafter positioned on the base 52 of the head 51 as indicated in FIG. 4.

The unit further comprises a horizontal push rod 56 stationed at a given point beyond the channel 55 and coinciding with the pickup point 45, which is reciprocated axially in such a manner as to transfer the stamps 8 and coupons 3 to the head 51 and thus bring about the step of taking up the stamps 8 and coupons 3.

Figure 6:
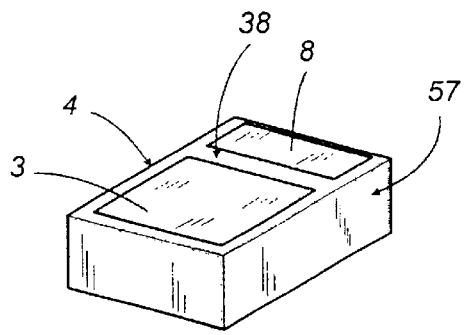
FIG. 6 and FIG. 7 illustrate two packets, schematically and in perspective, to which a stamp and a coupon have been applied respectively in two different configurations.
Figure 7:
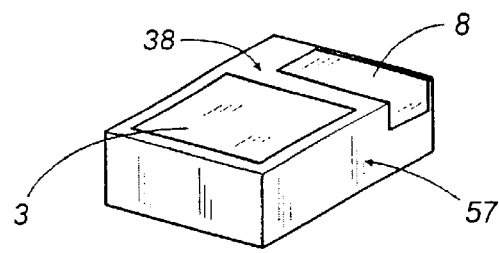

In the two embodiments illustrated in FIGS. 1, 2 and 3, the applicator devices 9 are designed to affix the stamps 8 and coupons 3 to and the same face 38 of each packet 4, as illustrated in FIG. 6. In the event that it is wished to apply the stamps 8 and coupons 3 to more than one face of each packet 4, as indicated in FIG. 7, where the revenue stamp 8 is applied with one end bent over an adjoining flank face 57 of the packet 4, the device 2 can be equipped with a further horizontal push rod 58 as illustrated in FIG. 5, which when extended will engage successive packets 4 raised by an elevator 59, directing each in turn onto the conveyor 33 and against a stop 60 located at the affixing station 7 in such a way as to operate in conjunction with the head 51. The stop 60 is capable of alternating movement between a position in which the packets 4 are intercepted and a position in which the packets pass through unobstructed.

Also indicated in FIG. 5 is a folder 61, located on the side of the head 51 opposite from the stop 60 and invested similarly with alternating movement, of which the function is to engage the free end of the stamp 8 projecting beyond the face 38 of the packet 4 and flatten it against the flank face 57.

Likewise in the embodiment of FIGS. 1 and 2, the stamp 8 can be applied to the packet 4 as indicated in FIG. 7; in this instance the drum 12 will be equipped with folder devices of conventional type, described and illustrated in U.S. Pat. No 5,111,633.

In operation, referring to the example of FIGS. 3 and 3a, the stamps 8 and coupons 3 are transferred singly by the respective circular sectors 32 to the channel 55 and disposed one alongside the other as illustrated in FIG. 3a, then advanced cyclically by the relative devices 44 toward the pickup point 45, passing through a gumming station 39 at which their outward facing surfaces are coated with glue by a spray nozzle 41. At the same time, the housing 46 is caused to pivot through 90° anticlockwise (as viewed in the drawing) by reason of the shaft 47 rotating about its own axis 48, and passes from the position depicted by phantom lines to the position indicated in bold line; this brings the applicator arm 43 up to the pickup point 45 and the shaft 49 assumes a horizontal position with the base 52 of the head 51 offered to the push rod 56, which is positioned adjacent to the point of exit from the channel 55.

Both the stamp 8 and the coupon 3 remain attached to the push rod 56, attracted by force of suction in conventional manner, and are then transferred by a movement that takes the push rod 56 from right to left (as viewed in FIG. 3) and into contact with the base 52 of the head 51, to which the stamp 8 and coupon 3 remain attached similarly in the position illustrated in FIG. 4 by suction generated through the respective sets of holes 53 and 54.

At this point the housing 46 rotates back through 90° clockwise to its former position, transferring the stamp 8 and the coupon 3 to a point above the feed path P and within the compass of the affixing station 7. The timing is also such that a relative packet 4 advancing along the feed path P on the belt conveyor 33 will reach the station 7 at the same time as the stamp 8 and the coupon 3, which are then directed by the head 51 onto the upwardly directed face 38 of the waiting packet 4, brought momentarily to a standstill.

The affixing step proper is effected by means of the axially slidable shaft 49, of which the forward stroke is made downwards along its own axis 50.

Importantly, in the embodiment of FIG. 3, the belt conveyor 33 will be driven intermittently and timed appropriately with the movements of the applicator arm 43.

The application of the stamp 8 as illustrated in FIG. 7 is effected by means of the folder 61 shown in FIG. 5, which comes into operation during a pause following the descent of the shaft 49 while the head 51 remains in contact briefly with the face 38 of the packet 4, intercepting the longitudinal end of the stamp 8 and flattening it against the flank face 57 of the packet 4.

It should be emphasized at this juncture that in the example of FIG. 5, the conveyor 33 is synchronized not only with the applicator arm 43, but also with the push rod 58 by which successive packets 4 are directed cyclically into contact with the stop 60.

Once the stamp 8 and the coupon 3 have been applied simultaneously to the packet, the folder 61 rotates anticlockwise into a raised, non operating position indicated by phantom lines in FIG. 5, whilst the stop 60 rotates clockwise into a position outside the line of the feed path P, allowing a slat 37 to engage the packet 4 and carry it forward along the direction of the arrow F1 toward the overwrapping machine 42.

What is claimed is:

1. A device for the application of detachable coupons to substantially parallelepiped packets in machines (1) for the manufacture of packets (4) to which revenue stamps (8) are applied, separate from coupons (3), comprising conveyor means (5) by which the packets (4) are advanced in succession along a predetermined path (P) toward a station (7) at which the stamps (8) and coupons (3) are affixed, and applicator means (9) in the vicinity of the affixing station (7), disposed and embodied in such a manner as to apply simultaneously both stamps (8) and coupons (3) to the packets (4), the applicator means (9) comprising a feeding and affixing unit (10) dispensing both the stamps (8) and the coupons (3) and comprising a rotary conveyor (12), operating substantially tangential to the feed path (P) at a point that coincides with affixing station (7), on which the stamps (8) and the coupons (3) are retained by means (21) distributed uniformly around a respective peripheral surface of revolution (19), each of the single retaining means (21) having a single surface (23) which aligns with a face of a single packet (4) as it is advanced on the conveyor (5), wherein the surface (23) has a plurality of externally presenting suction holes (24, 25) which define at least two different sets of holes, the sets being of different sizes (24, 25) ready to retain the stamps (8) and the coupons (3), respectively, so that one lateral side of each stamp (8) faces and is parallel to one lateral side of the coupon (3), each of the single retaining means (21) operating synchronously and in conjunction with the conveyor means (5) along the feed path (P) in such a way as to affix both a relative stamp (8) and a relative coupon (3) of different sizes at one and the same time to each packet (4), wherein the feeding and affixing unit comprises a unit (26) by which the stamps (8) and the coupons (3) are transferred to the retaining means (21) comprising first and second lines (27, 28) which occupy two different planes offset from one another and serve to store and feed the stamps (8) and the coupons (3), respectively, and operating synchronously and in conjunction with the retaining means (21).

2. A method for the application of detachable coupons to substantially parallelepiped packets in machines for manufacturing such packets, comprising the steps of advancing the packets (4) in succession along a predetermined path (P) toward an affixing station (7) and applying a revenue stamp (8) to each packet (4) passing through the station, wherein a coupon (3) is applied to each packet (4) at the affixing station (7) at one and the same time with a revenue stamp (8) of different size than the coupon (3) with one lateral side of each stamp (8) facing and being parallel to one lateral side of the coupon (3), the coupon (3) and the revenue stamp (8) being applied to each packet (4) by a single retaining means (21) when the retaining means (21) and the packets (4) meet at the affixing station (7), wherein the stamps (8) and coupons (3) are transferred to the retaining means (21) by first and second lines (27, 28) which occupy two different planes offset from one another and serve as a means to store and feed stamps (8) and coupons (3), respectively, and operating synchronously and in conjunction with the retaining means (21).

* * * * *